UNITED STATES PATENT OFFICE.

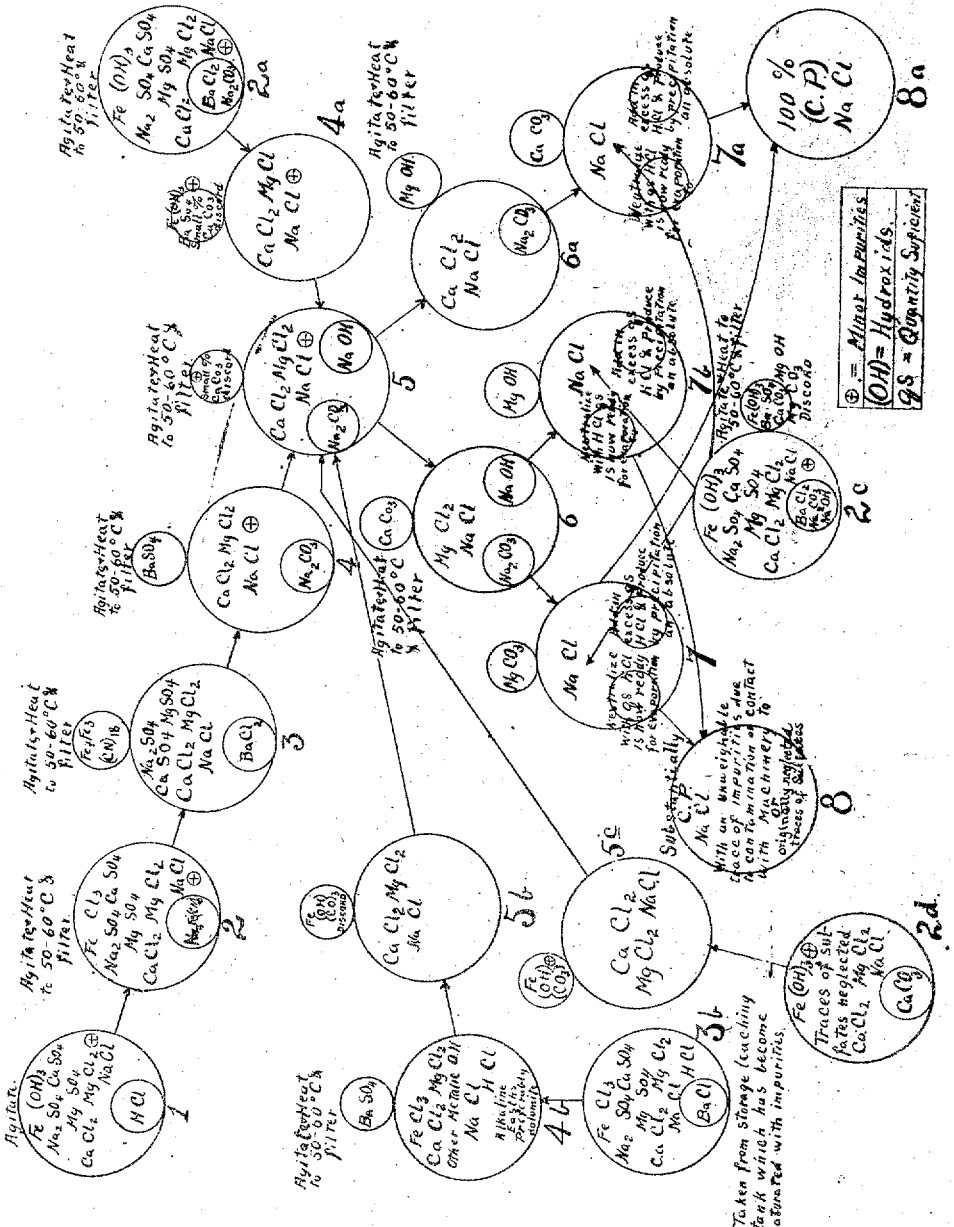

CHARLES GLASER AND GEORGE J. MULLER, OF BALTIMORE, MARYLAND.

PROCESS OF REFINING SALT AND RECOVERING ITS IMPURITIES AS BY-PRODUCTS.

957,416.  Specification of Letters Patent.  Patented May 10, 1910.

Application filed May 17, 1909. Serial No. 496,525.

*To all whom it may concern:*

Be it known that we, CHARLES GLASER and GEORGE J. MULLER, citizens of the United States, residing in the city of Baltimore, State of Maryland, have invented a new and useful Process of Refining Salt and Recovering Its Impurities as By-Products, of which the following is a specification.

The invention relates to the separation from salt (sodium chlorid) of the impurities which occur with it in nature and particularly those impurities with which it is generally sold in crude state prior to refining.

The object of the invention is to remove the impurities from the salt either absolutely as when the salt is desired for chemical or other uses where even a fractional percentage of impurity is undesirable or to reduce the proportion of impurities to such an extent as will make them wholly unobjectionable for ordinary commercial purposes; and to attain those results in a simple and efficient manner, and at a moderate cost.

One feature of the present invention consists in removing impurities from salt by the use of reagents of such character that the mass of salt or the elements thereof are increased on addition of each reagent and that only those elements of the impurities are thrown down or removed which do not enter into the composition of salt or which will not combine with an element of salt to produce an ingredient which may be thereafter attacked by other reagents; in other words this feature of the invention consists in treating the impurities with reagents which while precipitating elements that do not enter into the composition of salt, will add to the solution one of the elements of salt in such form or so combined that its associated element or elements may thereafter be precipitated by another reagent or reagents that will supply the other element of salt, so that the process is, in its effect, accumulative as to the sodium chlorid to be produced.

Another feature of the invention consists in purifying salt by leaching it with a solvent which consists of a saturated solution of pure salt containing acid of such character and restricted quantity as to dissolve certain impurities insoluble in water and thus making them amenable to further treatment and removal, the pure salt solution being preferably obtained by the process constituting the first feature of the invention and this portion of the process being preferably repeated after each leaching or after such number of leachings as may develop a workable percentage of impurities in the leaching liquor, in order to use the solvent repeatedly.

Another feature of the invention consists in treating a saturated solution of impure salt with hydrochloric acid in quantity so restricted as to avoid precipitating sodium chlorid, yet sufficiently large to make it an effective solvent for certain impurities and thereby render such impurities amenable to the reagents to be used.

Another feature of the invention consists in introducing into the solution of the salt with its impurities, a single reagent, such for instance as barium chlorid, having the capacity for reducing a plurality of impurities having a common characteristic (sulfates) and while precipitating the sulfur content of all in a single substance ($BaSO_4$) converting the bases of such impurities (*e. g.* $Na_2SO_4$, $CaSO_4$, $MgSO_4$) into chlorids.

Another feature consists in adding to the solution of salt and its impurities, preferably after the impurities have been reduced to chlorids, a special reagent for each of several impurities, in such quantity that each reagent acts upon the impurity intended to be removed thereby. And inasmuch as the impurities of salt either constitute or contain elements of commercially valuable chemical products, it is desirable to so conduct the process as to save, in commercial form, those impurities that have a commercial value; still another feature of the invention, consists in applying the said reagents successively to the solution and separating the precipitates and doing this in such a way, as to react upon the impurities successively in the order in which it is desired to precipitate and recover them and with reagents not only suitable in character to precipitate the elements to be removed, but suitable in quantity to limit each reaction to the specific impurity to be attacked by each reagent, at the particular step in the process.

Another feature of the invention consists in employing alkaline carbonates (for example, ground dolomite) as a reagent for eliminating iron and neutralizing the acid menstruum, without removing salt producing elements.

Further features consist in certain details in the carrying out of the process which will be hereinafter fully described and particularly pointed out in the claims.

To aid in comprehending the nature of the invention, we have illustrated by a graphic chart forming a part of this specification, various steps in several specific processes embodying the features of the invention, which steps naturally vary according to the ends to be attained and the conditions under which the operation is to be carried out. The several larger circles of the chart may be taken to illustrate a series of receptacles in which the reactions take place and the chemical symbols therein indicate their contents, while the contained smaller circles are to be understood as representing reagents introduced and the exterior smaller circles as representing precipitates developing from the reaction in the preceding receptacles.

It will be understood that in the several steps of the process, the reactions will be favored by constantly agitating the contents of the receptacles and maintaining a temperature of from 50° to 60° C.

Referring first to a process where it is desired to save such of the impurities as have sufficient commercial value to justify handling them separately, the process may be carried on as indicated graphically by the chemical symbols in the receptacles 1, 2, 3, 4, 5, 6 and 7 or 7$^b$, or 1 to 5, 6$^a$ and 7$^a$ to produce sodium chlorid; or may be carried a step farther from receptacles 7, 7$^a$ or 7$^b$, by treating with the reagents indicated at the left hand sides in said receptacles to produce substantially chemically pure sodium chlorid as indicated in receptacle 8; or from either of the receptacles 7, 7$^a$ or 7$^b$ a step may be taken as indicated by the reagent at the right hand side in each receptacle to produce 100% chemically pure sodium chlorid as indicated in the receptacle 8$^a$. Thus we find in receptacle 1, besides the principal ingredient sodium chlorid or commercial salt, its associated impurities, ferric hydroxid, sodium sulfate, calcium sulfate, magnesium sulfate, calcium chlorid, magnesium chlorid with perhaps other metallic hydroxids. To this hydrochloric acid is added in certain restricted quantity to throw it slightly beyond the neutral point, which has the effect of dissolving the iron and other metallic oxids as chlorids, as indicated in receptacle 2. Ferro-cyanid of sodium is now added with the result that ferri-ferro cyanid, of commercial value is precipitated, while the chlorin element of the ferric chlorid, of receptacle 2, combines with the sodium element of the reagent to form salt, which is added to the original content. The sulfuric radical is next eliminated by adding the reagent of receptacle 3—barium chlorid—with the result that all of the sulfur contents combined with sodium, calcium and magnesium are taken up by the barium and precipitated as $BaSO_4$. Here again, the sodium element combines with chlorin element of the reagent added and forms more salt and the calcium and magnesium exist as calcium and magnesium chlorid; sodium carbonate is now added to receptacle 4 in just sufficient quantity to precipitate any remaining chlorids of heavier metals and a small per cent. of calcium present which may be discarded. Here again the chlorin element combines with the sodium element added and produces more salt and this is continued in receptacle 5 until we find in receptacle 6 that all the chlorin of the calcium impurity has united with the sodium of the reagent to form more salt while the calcium is precipitated in the form of carbonate, and magnesium alone remains. Instead of introducing sodium carbonate in receptacle 5, sodium hydroxid can be introduced therein to develop the conditions indicated in receptacle 6$^a$ where the magnesium has been precipitated in the form of hydroxid, the chlorin element of the impurity combining with the sodium of the reagent to form more salt and the calcium impurity alone remains; the latter being thereafter removed by introducing the sodium carbonate to produce the condition illustrated in receptacle 7$^a$, where salt alone remains. Again referring to receptacle 6 the remaining magnesium impurity may be worked out by sodium hydroxid to produce the conditions indicated in the receptacle 7$^b$, or by the addition of sodium carbonate precipitate the magnesium as a carbonate as in 7. If the process is started as from 2$^a$, 2$^c$ or 2$^d$ then the product in receptacle 7, 7$^a$ or 7$^b$ will be a saturated solution of substantially pure sodium chlorid which is much purer than any product of the kind that can be bought in the market today and the residual impurities will be unweighable traces which are not objectionable in salt for table purposes.

When the purification is started as in 1 and 3$^b$ and brought to the condition illustrated in either of the receptacles 7, 7$^a$ or 7$^b$, the salt is brought to a pure state by further treatment in either of two ways; that is to say the solution may be neutralized with a sufficient quantity of hydrochloric acid and evaporated, when it will produce substantially chemically pure sodium chlorid with an unweighable trace of impurities due to contamination or contact with machinery etc. as indicated in receptacle 8, or the contents of either receptacle 7, 7$^a$, 7$^b$ may be treated with an excess of hydrochloric acid to precipitate an absolutely chemically pure sodium chlorid as indicated in receptacle 8$^a$.

It is not indispensable that steps from 1 to 7, 7$^a$ or 7$^b$ or 8 or 8$^a$ be carried on successively as indicated; on the contrary satisfactory results may be obtained by commencing as indicated in receptacle 2$^a$, with substantially the same impurities as indicated for the receptacle 1 and there introducing first the barium chlorid and then sodium carbonate as reagents and eliminating at once all impurities excepting chlorids of calcium and magnesium as indicated in receptacle 4ª, the precipitates being a mixture which may be discarded. Then the fifth step may be performed and the process carried from there on in either of the ways already explained. Or the process may be carried from the second to the seventh step directly, as for instance by taking the salt solution with the original impurities as indicated in receptacle 2ᶜ and there introducing three reagents, first barium chlorid, and subsequently sodium carbonate and sodium hydroxid and precipitating the iron-sulfate-calcium-and magnesium-impurities together with all the elements except those that enter into the composition of salt and at the same time combine all salt producing elements of the original impurities as well as of the reagents introduced to form salt, thereby arriving at the stage indicated in each of the receptacles 7, 7ª and 7ᵇ, from which point the process may be carried to completion by developing the conditions of the receptacle 8 or of the receptacle 8ª as may be desired. Or the process may be carried on as from 2ᵈ down to step 5 when the salt will contain but traces of any sulfate impurities which are not objectionable and are not desired to be removed. Here sodium carbonate is added in quantity just sufficient to precipitate a small per cent. of calcium as calcium carbonate yet enough to carry with it all iron, aluminum and other metallic hydroxids. Here the sodium element combines with the chlorin element of the impurity and forms more salt and the brine is then treated as from the fifth step down. In commercial use it will be desirable to employ a cheap source of alkali for the neutralization of acidulated brine and the removal of iron and other allied metals. This may be carried out in the series of steps commencing with 3ᵇ which contains an acidulated brine partly neutralized by dissolving and carrying with it the impurities which it takes up in the leaching process. Barium chlorid is now added to precipitate the sulfate content as $BaSO_4$. The solution is now completely neutralized by adding a carbonate of one or several alkaline earths such as dolomite, to remove iron and other allied metals and to leave only the chlorids of calcium and magnesium in solution with sodium chlorid as already described with reference to receptacle 5 to be treated by the steps set forth.

Having outlined the chemistry of the process, we will next proceed to describe an illustrative commercial process in which our invention is applied under actual conditions when the impurities are to be recovered in full and separately and prepared for commerce. Brine from a well may be used or sodium chlorid may be dissolved to make a saturated solution, filtered or otherwise separated from dust and dirt, the brine is now heated and kept at 50 to 60° C., hydrochloric acid is added in restricted quantity just sufficient to dissolve any colloidal or suspended hydroxids of heavier metals as chlorids without precipitating any sodium chlorid, ferrocyanid of sodium is now added to precipitate the iron of the ferric chlorid as ferri-ferro cyanid, the brine is now filtered or otherwise separated barium chlorid is now added to precipitate all sulfates as barium sulfate and the brine is again filtered or otherwise separated, next a small quantity of solution of a sodium carbonate is added to the brine for the purpose of precipitating in the form of basic carbonates any remaining heavier metals from their chlorids. With this will be precipitated a little carbonate of alkaline earth. The brine is again filtered or otherwise separated. The precipitate will ordinarily be discarded. The brine, still hot is now cautiously treated with a moderately strong solution of sodium carbonate in just such restricted quantity as to throw down, as carbonate, any alkaline earth such as calcium, but not magnesium. The brine is now filtered or otherwise separated from the precipitated carbonate which is washed clean, dried and is ready for sale. The brine, which contains now only magnesium as a foreign base to be removed, is now treated with sufficiently strong clean sodium carbonate solution to precipitate all of the magnesium present as magnesium carbonate which is separated from the brine in a well known way, washed clean, and dried, when it is ready for sale, or the brine is treated with a moderately strong sodium hydroxid solution to precipitate the magnesium as magnesium hydroxid, which is separated from the brine, washed clean dried and finally calcined, when it is ready for sale. Both are of a high degree of purity, answering to the requirements of *U. S. Pharmacopœia*. The brine thus obtained yields upon evaporation a salt of a high purity which will stay dry in any climate.

In meeting conditions of trade, a brine, made as described above may be successfully used to purify a solid salt of commerce and reduce it to the same fine condition. For example:—A small quantity of hydrochloric acid (1 to 4% preferably) is added to the purified brine and with this solution, salt is leached in suitable vessels. After dissolving the impurities contained therein, the salt is washed with successive portions of the unacidulated brine, until all impurities which have been dissolved are removed. The brine thus used as a leaching agent may be neutralized, purified and regenerated as often as necessary for repeated or separate use. As another example, when only the calcium and magnesium are to be recovered, sodium chlorid may be dissolved to produce a saturated brine or a brine of a specific gravity of 1.2 or over, such as forms the usual product of concentration of saline well-water and ready to be reduced to solid salt by further evaporation in the usual manner will be submitted. In a suitable tank provided with steam heat, a convenient quantity of brine is placed and heated to about 50-60° C. Since the composition of the brine is easily ascertainable by analysis, the approximate quantities of precipitating reagents are best calculated by such method. Barium chlorid is now added to precipitate all sulfates as $BaSO_4$ after which a solution containing about 10% of sodium carbonate is added in quantity slightly in excess of what is actually required for the precipitation of iron, aluminum and allied oxids. The oxids, mixed with a small quantity of calcium carbonate are allowed to settle and the clear supernatant salt brine is drawn off into a second tank, similarly provided with steam heat. The temperature of the brine is still kept at about 50-60° C. and under agitation of the brine more of the 10% sodium carbonate solution is introduced, (approximately the amount calculated from analysis) but toward the end careful observation is made to determine whether or not any magnesium carbonate appears. When this point is reached, a sample of the brine is tested for calcium. If a positive reaction is obtained, cautiously more of sodium carbonate is added under agitation of the brine, until magnesia is again observed to separate, when the above mentioned chemical test is repeated, and so on until all the calcium is removed. A careful operator will soon learn to see the end point, so that seldom more than one chemical test will be necessary. After allowing the calcium carbonate to settle the clear liquid is transferred to a third tank, in which magnesium hydroxid or magnesium carbonate is precipitated with the required quantity of sodium hydroxid or sodium carbonate solution, which may be of a strength of 30% or over, to avoid undue dilution of the brine. After settling of the magnesium hydroxid or magnesium carbonate, the brine is drawn off clear, and after neutralization with pure hydrochloric acid, is now ready for boiling down to pure solid salt or for use as a leaching solution for purification of ordinary solid salt, as already intimated above and an example of which is given hereinafter.

The different precipitates contained in the three settling tanks above referred to are separately drawn from their respective tanks and freed from the remaining brine by filtration or otherwise. The brine so obtained is added to the next charge of brine in the same state of purification. The sediment from the first tank, consisting principally of barium sulfates and basic carbonates of iron and aluminum and some calcium carbonate may be discarded. The sediment from the second tank is washed carefully in the filter until free from sodium chlorid, and then dried with or without heat. This produces a calcium carbonate of a high degree of purity. The sediment from the third tank is washed carefully in the filter until free from sodium chlorid, then dried as is usual in the production of magnesium carbonate or finally calcined, as is usual in the production of magnesium oxid. It will fully answer the requirements of the *U. S. Pharmacopœia*. The quantities of by-products thus obtained depend upon the quantities of basic impurities contained in the brine, and as these vary in the product of every well, no close figures can be given. The quantities of calcium carbonate obtainable vary from one to three per cent., of magnesium from one quarter to one per cent. In boiling down a purified brine for solid salt in vacuum pans an incrustation of the apparatus by sulfates and basic chlorids of calcium and magnesium is entirely obviated, thus removing one of the most serious and costly troubles of the salt maker. During boiling care is taken that no fresh impurities are introduced.

The purifying of commercial table salt by leaching with purified brine is not specifically claimed herein but is made the subject matter of our divisional application, filed November 17, 1909, Serial No. 525,566. It may be accomplished as follows. 1000 kilograms of commercial table salt are placed in a suitable leaching tank, provided with a filtering bottom. To 1000 kgs. of purified brine 10 to 40 kgs. of muriatic acid are added in a suitable storage tank placed above the leaching tank. After thorough mixing, this acidulated brine is allowed to run into the leaching tank completely covering the salt therein. It is allowed to stand in contact with the salt for 2 to 6 hours and is then drawn off and pumped back into the storage tank. 1000 kgs. of pure brine solution is now added in portions of 250 kgs. at a time, to the salt in the leaching tank, the earlier portions carrying with them the remaining impurities and acid, while the last portion will pass through as pure brine. The salt is now removed from the leaching tank and dried in a well-known manner. The yield is nearly 1000 kgs. The leaching brines are kept separate so as to allow their separate use, the last portion only, being replaced by fresh pure brine, taking the place of the previous lot, etc. When the acidulated brine has been used so often as to show an accumulation of workable impurities, it is removed and replaced by fresh acidulated brine, made from the advanced washing brines by addition of 10 to 40 kgs. of muriatic acid to the 1000 kgs. of brine. In practice the old acid brine is treated with barium chlorid to precipitate all sulfuric acid and neutralized preferably either by an alkaline solution or by finely ground earthy carbonates such as dolomite, which permits only the calcium and magnesium impurities to remain, the brine is now separated from its precipitates and is then freed from all bases except sodium chlorid in a manner above described for purifying brine.

Having thus described our invention, what we claim as new therein and desire to secure by Letters Patent, is:—

1. The process of purifying sodium chlorid which consists in adding to a solution of the impure sodium chlorid a quantity of hydrochloric acid sufficient to dissolve contained impurity not wholly soluble in water but insufficient to precipitate any of the sodium chlorid, then adding to the solution a reagent suitable in character and quantity to react upon and render the impurity separable from the sodium chlorid and at the same time add to the solution an element of sodium chlorid.

2. The process of purifying sodium chlorid which consists in adding to a solution of the impure sodium chlorid a quantity of hydrochloric acid sufficient to dissolve contained impurity not wholly soluble in water but insufficient to precipitate any of the sodium chlorid, then adding to the solution a reagent suitable in character and quantity to react upon and render the impurity separable from the sodium chlorid and at the same time increase the mass of salt.

3. The process of removing from sodium chlorid an impurity not wholly soluble in water, which consists in dissolving the impurity by adding to the solution a quantity of hydrochloric acid sufficient therefor but insufficient to precipitate any of the sodium chlorid, then adding to the solution a reagent suitable in character and quantity to react upon and render the impurity separable from the sodium chlorid and which reagent is also capable of adding to the solution an element of said chlorid.

4. The process of removing from sodium chlorid, a plurality of impurities not wholly soluble in water, which consists in adding to the impure solution, a quantity of hydrochloric acid sufficient to dissolve the impurities but insufficient to precipitate any of the sodium chlorid, and then subjecting the impurities to a reagent which renders them separable from the sodium chlorid and furnishes an element of sodium chlorid to the solution.

5. The process of removing from sodium chlorid a plurality of impurities not wholly soluble in water, which consists in adding to an impure solution of the sodium chlorid, a quantity of hydrochloric acid, sufficient to dissolve the said impurities but insufficient to precipitate any of the sodium chlorid and then subjecting the impurities to a plurality of reagents respectively reactive upon the several impurities to render them separable from the sodium chlorid and adapted to add to the solution an element of sodium chlorid.

6. The process of separating from sodium chlorid a plurality of impurities and recovering said impurities, which consists in adding to a solution of the impure sodium chlorid, a plurality of reagents respectively adapted to render the several impurities separable from the sodium chlorid; said reagents being added successively in the order in which they are desired to act upon the several impurities to be removed and in the order in which the impurities are to be recovered; and said reagents containing and being adapted to add to the solution sodium chlorid which combine with elements already present forming more and only sodium chlorid in addition to that already in solution and leaving only sodium chlorid in solution.

7. The process of removing from salt a plurality of impurities each containing an element of salt, which consists in treating the impure salt with a plurality of reagents each of which is reactive as to one of the impurities and contains an element which combines with the salt producing element of the impurity and adds to the sodium chlorid solution, more sodium chlorid.

8. The process of purifying salt which consists in treating the impure salt with a reagent that converts the impurity into one containing an element of salt and then subjecting said impurity to another reagent containing an element which combines with the salt producing element of the impurity to produce salt in addition to that already in solution.

9. The process of purifying salt which consists in adding to a solution of the impure salt, a reagent that is reactive as to the impurity to be removed and also contains a residual element which is one of the elements of salt and thereafter adding to the resultant solution another reagent containing an element that combines with the said residual element to form salt in addition to that already in solution.

10. The process of purifying salt containing a plurality of impurities which consists in adding to the solution of impure salt, a series of reagents, each of which precipitates one of the impurities to be removed, or a constituent thereof and at the same time leaves in solution an ingredient or ingredients which increase or assist in increasing the mass of salt.

11. The process of purifying salt containing impurities, including sulfates of alkali and earth metals which consists in acidulating the solution, adding barium chlorid to the acidulated solution in quantity sufficient to precipitate the sulfuric radical, then neutralizing the acidulated solution and simultaneously precipitating therefrom the contained impurities excepting those having an element of salt in their composition and thereafter adding a reagent composed of elements, one of which combines with the salt producing elements of the impurities to produce salt in addition to that already in solution while the remainder combine with the remaining elements of the impurities to form a precipitate.

12. The process of separating from sodium chlorid impurities in the form of oxids of iron and other heavier metals, sulfates of alkali and earth metals and chlorids of earth metals, which consists in adding to the acidulated saturated solution of the salt containing said impurities, barium chlorid, sodium carbonate and sodium hydroxid in the order named in quantities sufficient to precipitate the impurities in the form of barium sulfate, ferric hydroxid, carbonate of calcium and magnesium hydroxid and combining the sodium and chlorin elements of the reagents and of the impurities to form sodium chlorid in addition to the sodium chlorid sought to be purified.

13. The process of purifying sodium chlorid containing as impurities sulfates, which consists in adding to a solution of the impure sodium chlorid, barium chlorid in sufficient quantity to convert the sulfates into chlorids, thereby increasing in the solution the content of a salt producing element, and at the same time precipitating barium sulfate.

14. The process of separating sodium sulfate and other sulfates from sodium chlorid which consists in adding barium chlorid and producing barium sulfate, sodium chlorid in addition to that already contained and other chlorids and thereafter adding sodium carbonate and thereby converting the chlorids into more sodium chlorid and precipitating their bases as carbonates.

15. The process of separating from sodium chlorid ferric-chlorid, sodium sulfate, calcium sulfate, magnesium sulfate, calcium chlorid, and magnesium chlorid, which consists in adding to a solution of sodium chlorid containing said impurities, barium chlorid sufficient to precipitate the sulfuric radicals as barium sulfate and at the same time convert their bases into chlorids thereby adding to the solution more sodium chlorid and more of other chlorids named; then adding to the solution, an alkaline substance (alkaline or alkaline carbonate) sufficient to precipitate ferric hydroxid and leave calcium chlorid and magnesium chlorid in solution and then adding sodium carbonate sufficient to precipitate the calcium as calcium carbonate and convert its chlorin into still more sodium chlorid.

16. The process of separating from sodium chlorid, ferric-chlorid, sodium sulfate, calcium sulfate, magnesium sulfate, calcium chlorid, and magnesium chlorid, which consists in adding to a solution of sodium chlorid containing said impurities, barium chlorid sufficient to precipitate the sulfuric radicals as barium sulfate and at the same time convert their bases into chlorids thereby adding to the solution more sodium chlorid and more of other chlorids named; then adding to the solution, an alkaline substance (alkaline or alkaline carbonate) sufficient to precipitate ferric hydroxid and leave calcium chlorid and magnesium chlorid in solution; then adding sodium carbonate sufficient to precipitate the calcium as calcium carbonate and convert its chlorin into still more sodium chlorid and then adding more sodium carbonate sufficient to convert the magnesium of the magnesium chlorid into magnesium carbonate and its chlorin into still more sodium chlorid.

17. The process of separating from sodium chlorid ferric-chlorid, sodium sulfate, calcium sulfate, magnesium sulfate, calcium chlorid, and magnesium chlorid, which consists in adding to a solution of sodium chlorid containing said impurities, barium chlorid sufficient to precipitate the sulfuric radicals as barium sulfate and at the same time convert their bases into chlorids thereby adding to the solution more sodium chlorid and more of other chlorids named; then adding to the solution, an alkaline substance (alkaline or alkaline carbonate) sufficient to precipitate ferric hydroxid and leave calcium chlorid and magnesium chlorid in solution; then adding sodium carbonate sufficient to precipitate the calcium as calcium carbonate and convert its chlorid into still more sodium chlorid; and then adding sodium hydroxid to convert the magnesium of the magnesium chlorid into magnesium hydroxid and its chlorin into still more sodium chlorid.

18. The process of separating from sodium chlorid, impurities in the form of oxids and hydroxids of heavier metals and sulfates of alkali and earth metals and chlorids of earth metals which consists in adding to a solution of the impure salt, barium chlorid, followed by sodium carbonate and sodium hydroxid and thereby precipitating the impurities in the form of ferric hydroxid, barium sulfate, and carbonates or hydroxids of the earth metals, and combining the sodium and chlorin elements of the impurities and reagents to form salt in addition to that sought to be purified.

19. The process of separating from a solution of sodium chlorid impurities in the form of oxids of iron, alumina, etc., which consists in adding to the impure solution just sufficient hydrochloric acid to convert the basic impurities into chlorids.

20. The process of separating from a solution of sodium chlorid impurities in the form of oxids of iron alumina, etc., which consists in adding to the impure solution hydrochloric acid to convert their bases into chlorids, then adding sodium ferro cyanid to precipitate the iron content as Prussian blue and produce sodium chlorid, in addition to that in the solution to be purified.

21. The process of separating from a solution of sodium chlorid impurities in the form of oxids of iron, alumina, etc., which consists in adding to the impure solution hydrochloric acid to convert their bases into chlorids, then adding sodium ferro cyanid to precipitate the iron content as Prussian blue and at the same time combining the sodium element of the reagent with the chlorin elements of the impurities to form salt.

22. The process of separating from a solution of sodium chlorid, impurities in the form of oxids of iron, alumina, etc., sulfates of alkali and earth metals, which consists in adding to the impure solution, hydrochloric acid, to convert the oxids into chlorids then adding ferro cyanid of sodium to precipitate the iron content as Prussian blue and combine its chlorin element with the sodium element of the reagent to form sodium chlorid, then adding barium chlorid to precipitate the sulfuric radicals as barium sulfate and convert their bases into chlorids.

23. The process of separating from a solution of sodium chlorid, impurities in the form of oxids of iron, alumina, etc., sulfates of alkali and earth metals, which consists in adding to impure solution, hydrochloric acid, to convert the oxids into chlorids then adding ferro cyanid of sodium to precipitate the iron content as Prussian blue and combine its chlorin element with the sodium element of the reagent to form sodium chlorid, then adding barium chlorid to precipitate the sulfuric radicals as barium sulfate and convert their bases into chlorids, then adding to the solution just sufficient of an alkali to neutralize any free acid.

24. The process of separating from a solution of sodium chlorid, impurities in the form of oxids of iron alumina, etc., sulfates of alkali and earth metals, which consists in adding to the impure solution, hydrochloric acid, to convert the oxids into chlorids then adding ferro cyanid of sodium to precipitate the iron content as Prussian blue and combine its chlorin element with the sodium element of the reagent to form sodium chlorid, then adding barium chlorid to precipitate the sulfuric radicals as barium sulfates and convert their bases into chlorids, then adding to the solution just sufficient of an alkali carbonate to neutralize any free acid, precipitate a small per cent. of calcium as calcium carbonate and carry down any remaining heavier metals as carbonates and at the same time combine the sodium element of the reagent with the chlorin elements of the impurities to form sodium chlorid.

25. The process of separating from sodium chlorid impurities in the form of oxids of iron, alumina, etc., sulfates of alkali and earth metals, and chlorids of calcium and magnesium which consists in adding to the impure solution, hydrochloric acid, to convert the oxids into chlorids, then adding sodium ferro cyanid to precipitate the iron content as Prussian blue and combine its chlorin element with the sodium element of the reagent to form sodium chlorid, then adding barium chlorid to precipitate the sulfuric radicals as barium sulfates and convert their bases into chlorids, then adding to the solution just sufficient of an alkali carbonate to neutralize any free acid, precipitate a small per cent. of the calcium chlorid present as calcium carbonate and carry down any remaining heavier metals as carbonates and at the same time combine the chlorin elements of the impurities with the sodium element of the reagent to form sodium chlorid, then adding sodium carbonate to precipitate calcium chlorid as calcium carbonate and combine its element with the sodium element of the reagent to form sodium chlorid.

26. The process of separating from sodium chlorid impurities in the form of oxids of iron, alumina, etc., sulfates of alkali and earth metals, and chlorids of calcium and magnesium which consists in adding to the impure solution, hydrochloric acid, to convert the oxids into chlorids, then adding sodium ferro cyanid to precipitate the iron content as Prussian blue and combine its chlorin element with the sodium element of the reagent to form sodium chlorid, then adding barium chlorid to precipitate the sulfuric radicals as barium sulfates and convert their bases into chlorids, then adding to the solution just sufficient of an alkali carbonate to neutralize any free acid, precipitate a small per cent. of the calcium chlorid present as calcium carbonate and carry down any remaining heavier metals as carbonates and at the same time combine the chlorin elements of the impurities with the sodium element of the reagent to form sodium chlorid, then adding sodium carbonate to precipitate calcium chlorid as calcium carbonate and combine its element with the sodium element of the reagent to form sodium chlorid and then adding sodium carbonate to precipitate magnesium as magnesium carbonate and combine its element with the sodium element of the reagent to form sodium chlorid.

27. The process of separating from sodium chlorid impurities in the form of oxids of iron, alumina, etc., sulfates of alkali and earth metals, and chlorids of calcium and magnesium which consists in adding to the impure solution, hydrochloric acid, to convert the oxids into chlorids, then adding sodium ferro cyanid to precipitate the iron content as Prussian blue and combine its chlorin element with the sodium element of the reagent to form sodium chlorid, then adding barium chlorid to precipitate the sulfuric radicals as barium sulfates and convert their bases into chlorids, then adding to the solution just sufficient of an alkali carbonate to neutralize any free acid, precipitate a small per cent. of the calcium chlorid present as calcium carbonate and carry down any remaining heavier metals as carbonates and at the same time combine the chlorin elements of the impurities with the sodium element of the reagent to form sodium chlorid, then adding sodium carbonate to precipitate calcium chlorid as calcium carbonate and combine its element with the sodium element of the reagent to form sodium chlorid and then adding sodium hydroxid to precipitate magnesium as magnesium hydroxid and combine its chlorin element with the sodium element of the reagent to form salt.

The foregoing specification signed at Baltimore this fifteenth day of May, 1909.

CHARLES GLASER.
GEORGE J. MULLER.

In presence of two witnesses:
WM. H. H. RALEIGH,
GUSTAV BORNSCHEUER.